United States Patent [19]

Kudermann et al.

[11] Patent Number: 5,254,224
[45] Date of Patent: Oct. 19, 1993

[54] METHOD FOR INCREASING THE MOLAR RATIO OF ALUMINUM TO CHLORINE IN POLYALUMINUM CHLORIDE SOLUTIONS

[75] Inventors: Gerhard Kudermann, Alfter; Karl-Heinz Blaufuss, Windhagen, both of Fed. Rep. of Germany

[73] Assignee: VAW Aluminium AG, Bonn, Fed. Rep. of Germany

[21] Appl. No.: 854,113

[22] Filed: Mar. 19, 1992

[30] Foreign Application Priority Data

Mar. 20, 1991 [DE] Fed. Rep. of Germany ....... 4108972

[51] Int. Cl.$^5$ ............................................. C25B 1/26
[52] U.S. Cl. ............................................ 204/94
[58] Field of Search ................................. 204/94

[56] References Cited

U.S. PATENT DOCUMENTS

| | | | |
|---|---|---|---|
| 3,240,687 | 3/1966 | Konig | 204/94 |
| 3,767,549 | 10/1973 | Sasaki | 204/180 |
| 3,953,584 | 4/1976 | Danner | 423/462 |
| 4,053,570 | 10/1977 | Merkl | 423/462 |
| 4,203,812 | 5/1980 | Bergner | 204/94 |

FOREIGN PATENT DOCUMENTS 2309610 of 0000 Fed. Rep. of Germany .
7808891 of 0000 France .

Primary Examiner—T. M. Tufariello
Attorney, Agent, or Firm—Darby & Darby

[57] ABSTRACT

Disclosed is a method for increasing the molar ratio of aluminum to chlorine in a polyaluminum chloride solution by the electrochemical dissolving of aluminum, including contacting a polyaluminum chloride solution having a molar ratio of aluminum to chlorine of equal to or greater than 0.5 with a galvanic element. The galvanic element includes metallic aluminum and an electrochemically more noble metal. Contact is maintained until the aluminum to chlorine ratio is increased to the desired level.

10 Claims, 2 Drawing Sheets

METHOD FOR INCREASING THE MOLAR RATIO OF ALUMINUM TO CHLORINE IN POLYALUMINUM CHLORIDE SOLUTIONS

FIELD OF INVENTION

The present invention relates to a method for increasing the molar ratio of aluminum to chlorine in polyaluminum chloride ("PAC") solutions, by the electrochemical dissolution of aluminum.

BACKGROUND OF THE INVENTION

Basic aluminum chlorides have several important industrial applications. Aluminum chlorides are used in the cosmetics industry as an active ingredient in for example, anti-perspiration preparations, or in hemostatic preparations. Aluminum chlorides are also used for hydrophobizing textile materials, as tanning agents and as flocculants for water treatment. Recently, aluminum chlorides have been used in the preparation of refractory substances and inorganic fibers.

Aluminum chloride has conventionally been prepared from chemical processes, such as the double conversion of other basic aluminum salts, by partial hydrolysis of anhydrous aluminum chloride, by thermal split-off of hydrogen chloride from aluminum chloride-hexahydrate or by reaction of aluminum hydroxides.

Aluminum chlorides have also been prepared by electrochemical processes. In German patent 27 13 236 (corresponding to U.S. Pat. No. 4,203,812, the disclosure of which is hereby incorporated by reference), electrolysis of aluminum chloride solutions at 50° to 120° C. with the liberation of chlorine for the preparation of polyaluminum chloride solutions is described. Futhermore, electrolysis of PAC solutions between two aluminum electrodes for increasing the molar ratio of aluminum to chlorine is described in German patent 23 09 610 (corresponding to U.S. Pat. No. 3,953,584, the disclosure of which is hereby incorporated by reference).

Both of these electrochemical processes require the use of a specially prepared electrolysis cell. Because these methods involve the liberation of chlorine, special precautions must be taken regarding protection of the environment and assuring the safety of the workplace.

The prior art methods also involve high energy costs. In addition, chlorine, a valuable chemical, is lost in these methods. If the liberated chlorine is to be captured, expensive recycling equipment has to be installed.

OBJECTS OF THE INVENTION

It is an object of the present invention to avoid the disadvantages that have been described and to provide a method for increasing the ratio of aluminum to chloride in polyaluminum chloride solutions. The method can be used on an industrial scale, does not contaminate the environment, is relatively inexpensive and can be carried out with conventional equipment.

SUMMARY OF THE INVENTION

The present invention relates to a method for increasing the molar ratio of aluminum to chlorine in polyaluminum chloride solution by the electrochemical dissolving of aluminum, including contacting a polyaluminum chloride solution having a molar ratio of aluminum to chlorine of equal to or greater than 0.5 with a galvanic element. The galvanic element includes metallic aluminum and an electrochemically more noble metal. Contact is maintained until the aluminum to chlorine ratio is increased to the desired level.

DETAILED DESCRIPTION OF THE INVENTION

Figure 1:
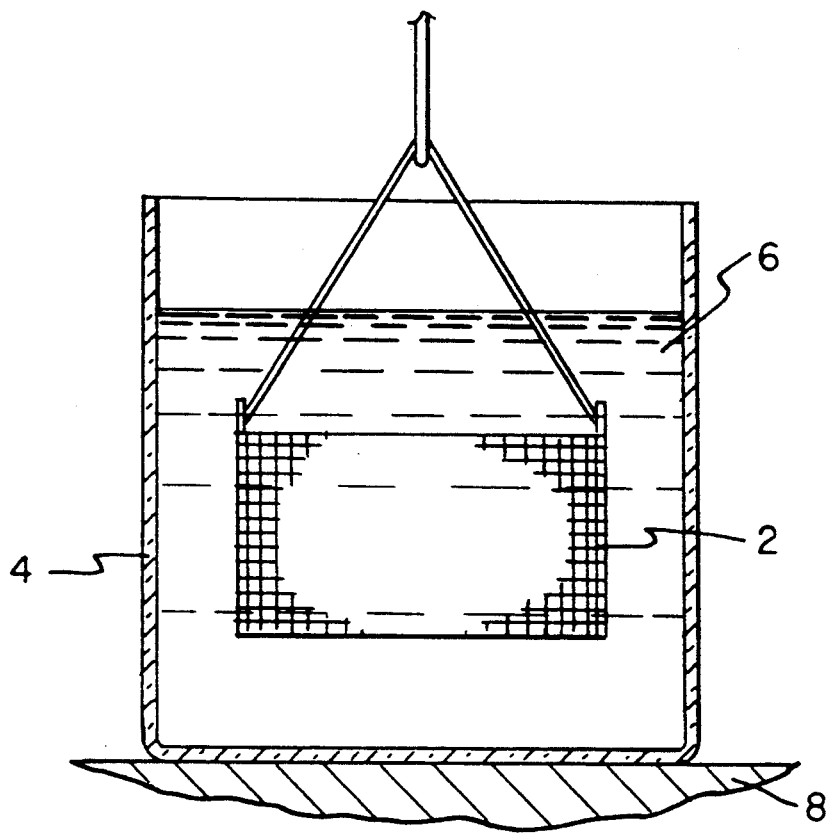
FIG. 1 is a cross-sectional view of one embodiment of the present invention. A wire basket 2 is shown immersed in a beaker 4 containing an aluminum chloride solution 6. The beaker rests on a heating plate. The wire basket may be constructed from wire made of (or coated with) platinum, palladium, copper, gold or silver. Contained within the wire basket are pieces of aluminum metal. The aluminum may be in the form of drillings, shavings, foils or other pieces exhibiting a large surface area.

The present invention relies on the principle of galvanic corrosion to cause dissolution of aluminum. Galvanic corrosion occurs due to electrochemical corrosion associated with the current in a galvanic cell. The current results from the difference in potential (emf) of two dissimilar metals in an electrolyte. Between two metals forming a galvanic couple, the galvanic series determines which will corrode or dissolve in an electrolyte. The galvanic series establishes the relative hierarchy of metals arranged in order from magnesium (least noble) through platinum (most noble).

According to the present invention, it is possible to avoid the use of external, applied current by employing the galvanic dissolution of aluminum. The design of the galvanic element makes it possible to manage with minimal amounts of the more noble metal. This can be accomplished, for example, by using a wire basket, made from the more noble metal, in which the aluminum to be dissolved is held in close contact with the more noble metal. The more noble metal is preferably platinum, although it is also possible to use copper, gold, silver or palladium. It is also possible to use a wire basket coated with the more noble metal.

The more noble components of the galvanic element can also be added in the form of salts, such as platinum chloride, gold chloride, copper chloride or mercury chloride. When metal salts are used, the metal ions are reduced immediately in solution, deposit on the surface of the aluminum metal and form galvanic elements (or couples).

For aluminum chloride intended for use in the cosmetic industry, it is necessary that the pH of the aluminum chloride solution be approximately neutral (pH=3.5 to 4) and that the molar ratio of aluminum to chlorine be about 2. This is accomplished most efficiently by the use of mercury as the more noble metal.

Due to the gentle, galvanic conversion at temperatures ranging from about 40° to 80° C., the mercury content of the resultant PAC solution is below the detection limit of 1 µg/L. A copper-containing aluminum alloy can be used directly as the galvanic element. By using a more noble metal in the liquid state, such as mercury, the dissolution of aluminum can be accelerated successfully, even with higher pH values. By these means, solutions containing more than 122 g/L of aluminum can be obtained.

As the pH and the aluminum content of the PAC solution increase, oxidic aluminum compounds (presumably aluminum hydroxide) are deposited at the cathode, during anodic dissolution of aluminum obtained with an external voltage. These deposits lead to an interruption of the current flow. According to our observations, these deposits occur at voltages as low as 2 V, which is the minimum voltage required for a useful dissolution rate of the aluminum anode. Deposits also occur when the solution reaches pH values above 2.9 and with aluminum concentrations above 90 g/L. Aluminum concentrations of up to 122 g/L are therefore achievable only by employing special and expensive measures, such as the continuous cleaning of the cathode.

The invention is described in greater detail by means of several examples and a comparison example. It is to be understood that these examples are provided by way of illustration and not by way of limitation.

EXAMPLES 1–11

A polyaluminum chloride solution was used as the starting solution. It was prepared from the residue solution obtained from the etching of aluminum foil, for example, during the manufacture of capacitor foil. The composition of the starting solution is given in Table 1.

TABLE 1

| Analysis of the Starting Solution | |
|---|---|
| Al | 30 g/L |
| Cl | 80 g/L |
| molar ratio | 0.50 |
| Impurities | |
| Mn | 0.08 g/L |
| Ca | 0.02 g/L |
| Mg | 0.006 g/L |
| Si | 0.01 g/L |
| Fe | 0.003 g/L |
| Cu, Ti | 0.0005 g/L |
| Na | 0.007 g/L |
| remainder each | <0.001 g/L |

The method parameters for the dissolution of aluminum are given in Table 2. The water lost during the dissolution process by evaporation is replenished continuously. As a result, the polyaluminum chloride solutions with the compositions given in Table 2 and the impurities given in Table 1 were obtained.

TABLE 2

| | | Dissolution of Aluminum at a Temperature of 80° C. | | | | |
|---|---|---|---|---|---|---|
| No. | Time h | Method | Al dissolved g/l | pH | $Al_{total}$ g/l | Cl g/L | MR* Al/Cl |
| 1 | 0.25 | Hg galv. | 4.5 | 0 | 34.5 | 80 | 0.57 |
| 2 | 3.5 | Hg galv. | 92 | 3.8 | 122 | 80 | 2.00 |
| 3 | 4 | Hg galv. | 114 | | 144 | 80 | 2.36 |
| 4 | 0.5 | Al with 50 ppm Cu | 4.5 | 0 | 34.5 | 80 | 0.57 |

TABLE 2-continued

| | | Dissolution of Aluminum at a Temperature of 80° C. | | | | |
|---|---|---|---|---|---|---|
| No. | Time h | Method | Al dissolved g/l | pH | $Al_{total}$ g/l | Cl g/L | MR* Al/Cl |
| 5 | 36 | Al with 50 ppm Cu | 92 | 3.8 | 122 | 80 | 2.00 |
| 6 | 18 | Al with 200 ppm | | | | | |
| 7 | 9 | CuAl with 0.5% Cu | 92 | 3.8 | 122 | 80 | 2.00 |
| 8 | 120 | CuAl galv. | 92 | 3.8 | 122 | 80 | 2.00 |
| 9 | 120 | Pt galv. | 92 | 3.8 | 122 | 80 | 2.00 |
| 10 | 120 | Au galv. | 92 | 3.8 | 122 | 80 | 2.00 |
| 11 | 120 | Ag galv. | 92 | 3.8 | 122 | 80 | 2.00 |

*MR = Molar Ratio.

TABLE 3

| | Comparison Trial | | | | |
|---|---|---|---|---|---|
| Time h | Method | Al dissolved g/l | pH | $Al_{total}$ g/l | Cl g/l | MR Al/Cl |
| 0.5 | anodic | 4.5 | 0 | 34.5 | 80 | 0.57 |
| 24 | anodic | 92 | 3.8 | 122 | 80 | 2.00 |

The contents of the more noble components of the galvanic element in the product solution were determined to be as follows.

| Element | mg/L |
|---|---|
| Cu | 0.5 (corresponding to the starting solution) |
| Pt | <0.01 |
| Au | <0.01 |
| Ag | <0.01 |
| Hg | <0.0001 |

All the experiments described here were carried out in glass beakers, which were heated on a hot plate.

During the electrochemical reaction of the present method, the less noble aluminum is in metallic contact with a more noble metal in an aqueous polyaluminum chloride solution. In this way, a galvanic couple is formed. The less noble aluminum is corroded by galvanic action and goes into solution and, at the same time, hydrogen is deposited at the more noble element. The dissolution of 92 g of aluminum per liter corresponds to a theoretical current flow of 268 amp hours and, in the case of complete solution in 3.5 hours, to an evolution of 16 mL of hydrogen per second. It is clear that for this reaction to occur efficiently, appropriate contact areas between the two components of the galvanic couple and, at the more noble element, the appropriate surfaces for the hydrogen reduction and the hydrogen deposition must be present. In addition, free aluminum metal surfaces, which permit dissolution of the aluminum, must be present.

In Examples 8–11 of Table 2, wire baskets were made in each case from a metal more noble than Al, such as Cu, Pt, Au or Ag (see FIG. 1). It is also possible to use wire baskets coated with the more noble metal. As far as possible, the wire baskets should have a closed bottom, in order to prevent any material filled into the basket falling through the mesh. The wire baskets were filled with aluminum, preferably pure (>99.5% pure) aluminum metal, for example, in the form of shavings, film, pieces, granulated metal, scrap or wrought product residues. In order to ensure adequate contact between the aluminum and the more noble metal, it may be necessary, depending on the nature of the aluminum in the basket, to weight down this material at least partially with a weight to ensure good contact between the Al and the more noble metal. In this case, weights of an inert material or of aluminum are preferably used.

Figure 2:
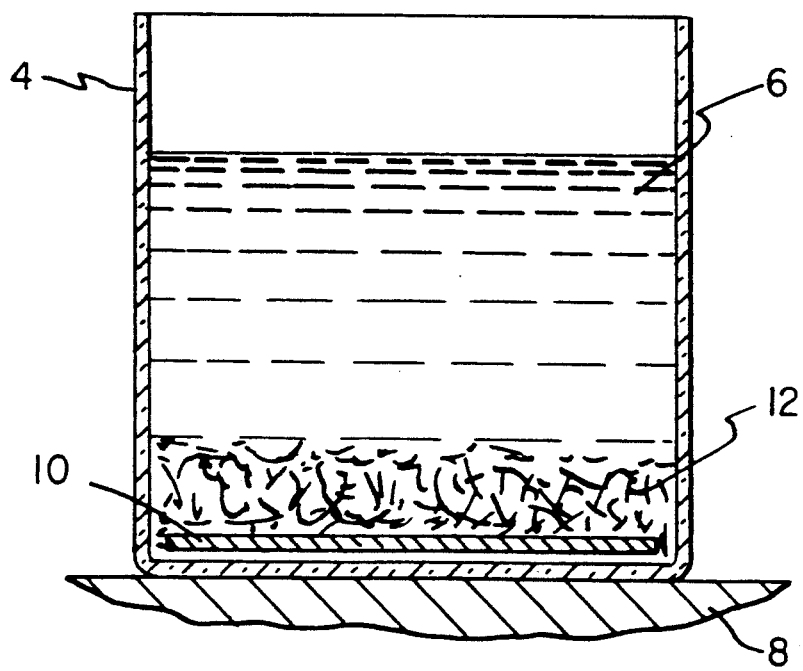
FIG. 2 is a cross-sectional view of another embodiment of the present invention. A metal plate 10 made of platinum, palladium, copper, gold or silver is provided within a glass beaker. Aluminum pieces 12 are provided within the beaker resting on the metal plate. The beaker contains a solution of aluminum chloride.

Instead of using wire baskets, it is also possible to place plates or sheets of the more noble metal on the bottom of the reaction vessel (see FIG. 2). Moreover, the whole of the reaction vessel or individual parts therefor may also be made from the more noble metal.

When aluminum alloys are used, the material is brought into the solution without other metallic contact. The more noble metal element, such as Cu, is already present here as the alloying element (see Examples 4 to 7).

Figure 3:
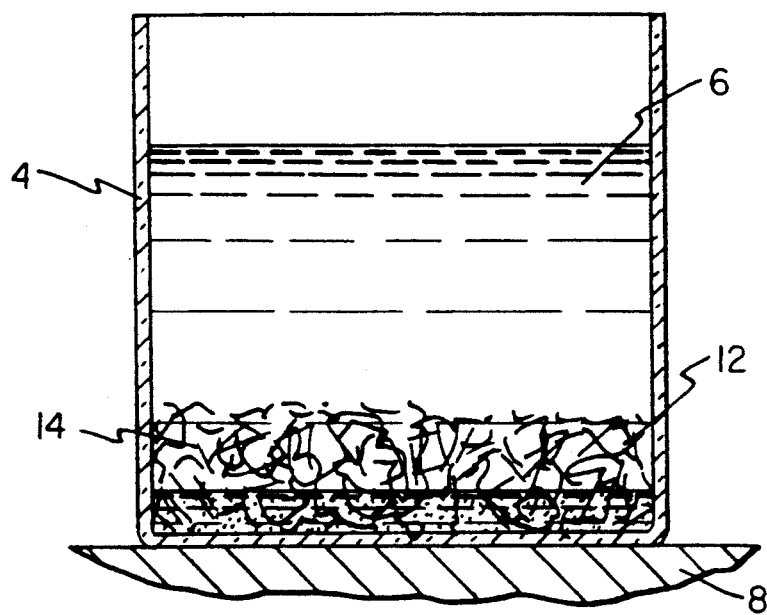
FIG. 3 is a cross-sectional view of another embodiment of the present invention. This embodiment is similar to the embodiment of FIG. 2 except that liquid metal 14 such as mercury is provided within the glass beaker in place of the metal plate of FIG. 2.
Figure 4:
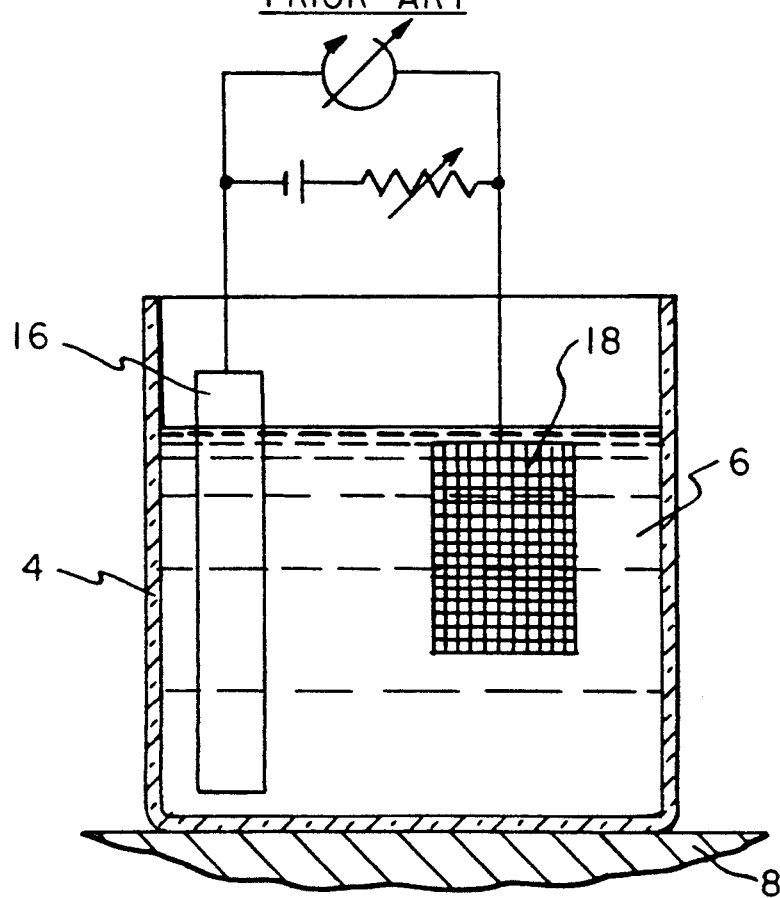
FIG. 4 is a schematic view showing a prior art electrolysis apparatus for dissolving aluminum.

Particularly advantageous dissolution conditions are attained if metal liquids such as mercury are used as the more noble component (see Examples 1 to 3). In this case, the bottom of the reaction vessel here was covered with mercury (see FIG. 3). The aluminum added is immersed in the liquid metal. In this case, the dissolution times are markedly shorter than for the other examples. The amount of aluminum added was selected in all cases so that the aluminum was always present in an stoichiometric excess based on the amount of the solution.

The comparison experiments of Table 3 were carried out under conditions of electrolysis employing the same starting solution. A piece of aluminum, which was connected as anode 16, was submerged into the solution. In this case, a platinum mesh was used as cathode 18. An external voltage was applied to the electrodes, so that an electrolysis reaction with current flow was initiated. Aluminum was dissolved at the anode. At the same time, hydrogen was deposited at the cathode. With this anodic dissolution of the aluminum, it was possible to attain the given molar ratio or the given aluminum content only by periodically removing the deposits (see comparison experiments in Table 3).

EXAMPLES 12–20

From hydrochloric acid and high-grade aluminum, a polyaluminum chloride starting solution of the following composition was prepared:
Al: 52 g/L
Cl: 111 g/L
molar ratio of Al:Cl=0.6

In each of the following examples tabulated in Table 4, 100 mL of this starting solution were added to round bottom flasks, which were provided with reflux condensers.

In Examples 12, 14, 16, 18 and 19, the galvanic element was formed from an aluminum alloy with at least one alloying element more noble than aluminum (Cu, Fe). In Examples 13, 15 and 17, high-grade aluminum and $CuCl_2$ were added to the starting solution. The copper cements to the aluminum metal as a copper sponge, by which means the desired galvanic element is formed. In Example 20, a copper sheet was placed on the bottom of the reaction vessel and high-grade aluminum was applied thereon. In addition, Cu strips were stuck into the aluminum.

The reaction vessels were then maintained for up to about 70 hours at a temperature between 65° and 80° C. Subsequently, the solution was filtered and analyzed. The results are summarized in Table 4. Losses of solvent were largely avoided by the reflux condenser. The hydrolysis of the metal, however, led to a certain consumption of water and, accordingly, to higher chloride contents in the product solutions than in the starting solution.

TABLE 4

Starting Solution: Al 52 g/L, Cl 111 g/L, in each case 100 mL
Materials Used: 12 g of Al of different composition and optionally Cu salts or metallic Cu
Solution Temperature: 65° to 80° C.

| No. | Materials Used | Dissolving Time | pH | Al | Fe | Cl | Cu | MR* |
|---|---|---|---|---|---|---|---|---|
| 12 | Al alloy with 0.00048% Cu and 0.84% Fe | 19 | 3.5 | 185.1 | 0.53 | 123 | <2 | 1.98 |
| 13 | Al 99.9 + 0.15% Cu (added as $CuCl_2$) | 70 | 3.5 | 180 | 0.056 | 122 | 2 | 1.94 |
| 14 | Al alloy with 0.01% Cu | 70 | 3.2 | 143.3 | 0.055 | 119 | 3 | 1.58 |
| 15 | Al 99.9 + 0.05% Cu (added as $CuCl_2$) | 70 | 3.5 | 176 | 0.055 | 120 | <2 | 1.93 |
| 16 | Al alloy with 0.02% Cu and 0.27% Fe | 70 | 3.5 | 179.4 | 0.38 | 120 | 15 | 1.96 |
| 17 | Al 99.9 + 0.005% Cu (added as $CuCl_2$) | 70 | 3.5 | 178 | 0.061 | 122 | 14 | 1.92 |
| 18 | Al alloy with 0.2% Cu and 0.27% Fe | 70 | 3.5 | 191.5 | 0.32 | 122 | 40 | 2.06 |
| 19 | Primary aluminum pig with 1.5% Fe | 5 | 3.7 | 182.5 | 0.52 | 127.6 | — | 1.87 |
| 20 | Al 99.9 + 6.2 g Cu sheets and Cu strips | 70 | 3.5 | 175.7 | 0.026 | 121 | <2 | 1.91 |

*MR = Molar Ratio.

The results of Examples 12–20 show that iron, which is more noble than aluminum, provides an acceleration of the dissolving rate, even at pH values above 3. The reaction predominantly is a catalysis by the redox system (Fe(II)/Fe(III)). In this case, the iron can be used either as alloying element or also as a dissolved iron salt. At iron contents above about 0.8% in an aluminum alloy, the dissolution rate for Al increases greatly. However, the resultant product solutions have iron concentrations of up to about 0.5 g/L (Examples 12 and 19). Excess iron was precipitated as iron hydroxide and could be filtered off. At the existing pH values 3.5 and 3.7, the dissolved iron would also have precipitated as iron hydroxide. After oxidation with $H_2O_2$, however, it remained in solution (the solution turned yellow). It is therefore assumed that the iron, like the aluminum, is present as the polychloride.

A high dissolution rate is also brought about by copper, when used as an alloying component, as a salt (such as $CuCl_2$) or as a metallic material in direct contact with the aluminum. In such a case, extremely slight amounts of Cu of about 0.005% added as $CuCl_2$ (see Example 17), produce better results than do Cu concentrations in an aluminum alloy of about 0.01% Cu (see Example 14). The lining of the bottom of the reaction vessel with copper sheet as well as the introduction of further strips of copper sheets between the aluminum shavings that have been added also brings about a high dissolution rate (see Example 20). In none of the experiments was a significant increase observed in the copper concentration of the product solution. It is of advantage to always have an excess of aluminum in contact with the more noble metal to avoid a dissolution of the more noble metal.

One of the factors which has a significant effect on the pH of the product solutions is the salt concentration. In the industrial application of the present method, the measurement of the pH can be used to control the process.

In practical applications, the use of iron-containing aluminum can be of advantage, if a polyaluminum chloride solution for water purification is to be produced. Under some circumstances, iron improves the flocculation and settling behavior of the precipitate. For further applications of the polyaluminum chloride solutions, such as in the cosmetics industry, the use of dissolving containers with copper bottoms (sheet metal) and/or the addition of the aluminum with a copper wire basket is recommended. Copper salts can optionally be added additionally to accelerate the reaction.

What is claimed is:

1. A method for increasing the molar ratio of aluminum to chloride in an aluminum chloride solution by the electrochemical dissolution of aluminum, comprising:
   contacting a starting aluminum chloride solution having a molar ratio of aluminum to chlorine equal to or greater than 0.5, with a galvanic element, said galvanic element comprising aluminum metal and an electrochemically more noble metal, whereby said aluminum metal will dissolve electrochemically.

2. A method for increasing the molar ratio of aluminum to chloride in an aluminum chloride solution by the electrochemical dissolution of aluminum, comprising:
   heating a starting aluminum chloride solution having a molar ratio of aluminum to chlorine equal to or greater than 0.5, to a temperature of between about 50° and 120° C.;
   contacting said solution with a galvanic element, said galvanic element comprising metallic aluminum and an electrochemically more noble metal; and
   maintaining said contact until said aluminum to chlorine ratio is increased.

3. The method of claim 1, wherein said galvanic element further comprises at least one additional metal which is electrochemically more noble than aluminum, said additional metal being in contact with the solution and the surface of the aluminum.

4. The method of claim 3, wherein said electrochemically more noble metal is selected from the group consisting of mercury, copper, gold, silver palladium and platinum.

5. The method of claim 1, wherein said starting aluminum chloride solution has the composition $Al_2(OH)_nCl_{6-n}$, in which $2 \leq n \leq 5$.

6. The method of claim 1, wherein said more noble metal is a liquid.

7. The method of claim 6, wherein said liquid metal is mercury.

8. The method of claim 1, wherein said more noble metal is a metal salt.

9. The method of claim 1, wherein said galvanic element comprises an alloy of aluminum and a metal more noble than aluminum.

10. The method of claim 9, wherein said metal more noble than aluminum is selected from the group consisting of copper, iron and mixtures thereof.

* * * * *